United States Patent
Cherubini et al.

(10) Patent No.: US 8,982,500 B1
(45) Date of Patent: Mar. 17, 2015

(54) CONTROLLING THE TRANSPORT OF A TAPE WITHIN A TAPE TRANSPORT SYSTEM

(71) Applicant: International Business Machines Corporation, Armonk, NY (US)

(72) Inventors: Giovanni Cherubini, Rueschlikon (CH); Jens Jelitto, Rueschlikon (CH); Angeliki Pantazi, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/450,829

(22) Filed: Aug. 4, 2014

(30) Foreign Application Priority Data

Aug. 29, 2013 (GB) .................................... 1315354.9

(51) Int. Cl.
- *G11B 17/00* (2006.01)
- *G11B 5/584* (2006.01)
- *G11B 21/02* (2006.01)
- *G11B 15/46* (2006.01)
- *G11B 15/48* (2006.01)
- *G11B 15/43* (2006.01)

(52) U.S. Cl.
CPC ...................................... *G11B 15/43* (2013.01)
USPC ......... 360/71; 360/77.12; 360/75; 360/73.04; 360/74.3; 242/324

(58) Field of Classification Search
None
See application file for complete search history.

(56) References Cited

U.S. PATENT DOCUMENTS

| | | | |
|---|---|---|---|
| 4,084,117 A * | 4/1978 | Vogel et al. .................... 318/6 |
| 4,739,948 A | 4/1988 | Rodal et al. |
| 6,836,386 B2 | 12/2004 | Koski |
| 2006/0072235 A1 | 4/2006 | Kuse et al. |
| 2009/0316296 A1 | 12/2009 | Cherubini et al. |
| 2010/0135129 A1 | 6/2010 | Mahnad |
| 2011/0134562 A1 | 6/2011 | Cherubini et al. |
| 2012/0305692 A1* | 12/2012 | Suzuki et al. ................ 242/334 |
| 2013/0016439 A1 | 1/2013 | Argumedo et al. |

FOREIGN PATENT DOCUMENTS

| GB | 2362984 A | 12/2001 |
| WO | 2012010498 A1 | 1/2012 |

OTHER PUBLICATIONS

G. Cherubini, et al., "Control Methods in Data-Storage Systems," IEEE Transactions on control systems technology, vol. 20, No. 2, Mar. 2012, pp. 1-31.

(Continued)

*Primary Examiner* — Andrew L Sniezek
(74) *Attorney, Agent, or Firm* — Cantor Colburn LLP

(57) ABSTRACT

A control device for controlling tape transport within a tape transport system is disclosed. The control device includes a determination unit, which includes at least a first servo channel and a second servo channel for determining a first lateral position of a tape relative to the head, and for determining a difference between the first and second lateral positions. A computing unit computes a number of unsupported wraps of the tape as a function of the lateral position difference, wherein the number of unsupported wraps corresponds to the number of layers of the tape around the take-up reel having air layers in-between, and computes a spring constant of the tape as a function of the number of unsupported wraps, a radius of the take-up reel and a nominal tape path length. A calibration unit calibrates at least one unit of the tape transport system dependent on the spring constant.

17 Claims, 8 Drawing Sheets

(56) References Cited

OTHER PUBLICATIONS

Intellectual Property Office UK, Application No. GB1315354.9; Patents Act 1977: Search Report Under Section 17(5); Date Mailed: Feb. 21, 2014; pp. 1-3.

W.S. Lee, et al, "Tape Transport Modeling and Controller Design," Control 2004, University of Bath, UK, Sep. 2004, ID-036, pp. 1-5.

D. Tenne, et al., "Robust Feed-Forward/ Feedback Design for Tape Transport," Navigation and Control Conference, 2004, pp. 1-6.

H. Zhong, et al., "Feedforward Control to Attenuate Tension Error in Time-varying Tape Systems," American Control Conference, Jun. 2008 pp. 1-6.

* cited by examiner

CONTROLLING THE TRANSPORT OF A TAPE WITHIN A TAPE TRANSPORT SYSTEM

FOREIGN PRIORITY

This application claims priority to Great Britain Patent Application No. 1315354.9, filed Aug. 29, 2013, and all the benefits accruing therefrom under 35 U.S.C. §119, the contents of which in its entirety are herein incorporated by reference.

BACKGROUND

The invention relates to a device and to a method for controlling the position of a tape within a tape transport system by calibrating units of the tape transport system considering the spring constant of the tape, dependent on the number of unsupported wraps caused by air entrainment.

In modern tape storage systems, the capacity and performance of the tape storage systems have increased considerably. To achieve higher cartridge or tape capacities and improved performance, however, further advances in several areas are necessary. Increases in linear and track densities on the tape may be required in order to achieve higher storage capacities. However, increase in linear densities may lead to a decrease of the distance between adjacent bit cells, which in turn may lead to an increase of inter-symbol interference. Increase in track densities may lead to narrower individual track widths and narrower write and/or read heads, which may require a very precise control of the tape transport system and track-follow control of the tape head. Thus, reliable and precise tape transport is of importance to guarantee read-channel performance on all parallel data channels during tape operation.

An increase in volumetric density may be enabled by the use of thinner tape material. In this case, to achieve a reliable and precise tape transport, tight control of tension and potentially of tape dimensional stability (TDS) variations may become necessary. Usually, the performance of the tape transport servomechanism and the quality of readback signals in data channels are affected by variations in the tape velocity and tension. For instance, during operation in cruise velocity mode, periodic variations of tape velocity and tension around the nominal value, also called once-around, may be induced by reel eccentricities. This problem may become critical when the reel rotation frequencies are near the resonance frequency determined by the tape path.

Conventionally, for the tape transport operation, a dual servo channel provides estimates of the tape velocity, tape longitudinal position, and head lateral position, which are derived from servo signals that are obtained by servo readers in the head module reading pre-formatted servo information on tape. In tape transport control systems, the tape velocity measured at the head using pre-formatted servo information, the so-called primary velocity, and secondary velocities are used for a velocity control during cruise mode. Hall sensors can be used to obtain the secondary tape velocity information from the individual reels, which information is typically used to achieve proper tape transport operation in the absence of valid parameter estimates from the servo channel.

However, during operation in cruise velocity mode, variations of tape tension around the nominal value may be induced by reel eccentricities leading to tension variations and therefore time-varying fluctuations of the individual data track widths and time varying spacing between individual data tracks, as the tape is stretched differently depending on the actual tape tension. In tape transport, this problem may be particularly serious when the reel rotation frequencies are near the resonance frequency determined by the tape path. Tape tension errors may also affect the position error signal used for track-following control, and hence the performance of the track-following servo system which aligns the head with the tape.

Therefore, a proper operation of a tape transport control system may require the knowledge of parameter values that determine the characteristics of the tape transport system. A system for operating a reel-to-reel system, which uses information in view of tension disturbances, is for example disclosed in US 2011/0134562 A1.

SUMMARY

In one embodiment, a control device for controlling the transport of a tape within a tape transport system is disclosed. The tape transport system has a head operable to read data from and/or write data to the tape, a supply reel and a take-up reel, wherein the tape is moveable from the supply reel to the take-up reel. The control device includes a determination unit having at least a first servo channel and a second servo channel to determine a first lateral position of the tape relative to the head from information of the first servo channel and a second lateral position of the tape relative to the head from information of the second servo channel, and to determine a lateral position difference between the first lateral position and the second lateral position; a computing unit configured to compute a number of unsupported wraps of the tape as a function of the lateral position difference, wherein the number of unsupported wraps corresponds to the number of layers of the tape around the take-up reel having air layers in-between, and to compute a spring constant of the tape as a function of the number of unsupported wraps, a radius of the take-up reel and a nominal tape path length; and a calibration unit configured to calibrate at least one unit of the tape transport system dependent on the spring constant.

In another embodiment, a tape transport system includes a head operable to read data from and/or write data to a tape; a supply reel and a take-up reel, wherein the tape is moveable from the supply reel to the take-up reel; and a control device configured to control transport of the tape. The control device further includes a determination unit having at least a first servo channel and a second servo channel to determine a first lateral position of the tape relative to the head from information of the first servo channel and a second lateral position of the tape relative to the head from information of the second servo channel, and to determine a lateral position difference between the first lateral position and the second lateral position; a computing unit configured to compute a number of unsupported wraps of the tape as a function of the lateral position difference, wherein the number of unsupported wraps corresponds to the number of layers of the tape around the take-up reel having air layers in-between, and to compute a spring constant of the tape as a function of the number of unsupported wraps, a radius of the take-up reel and a nominal tape path length; and a calibration unit configured to calibrate at least one unit of the tape transport system dependent on the spring constant.

In another embodiment, a method is disclosed for controlling the transport of a tape within a tape transport system, the tape transport system having a head operable to read data from and/or write data to the tape, a supply reel and a take-up reel, wherein the tape is moveable from the supply reel to the take-up reel, wherein the tape system comprises a control device comprising a determination unit having at least a first servo channel and a second servo channel. The method includes determining a first lateral position of the tape relative to the head from information of the first servo channel and a second lateral position of the tape relative to the head from information of the second servo channel; determining a lateral position difference between the first lateral position and the second lateral position; estimating a number of unsupported wraps of the tape as a function of the lateral position difference, wherein the number of unsupported wraps corresponds to the number of layers of the tape around the take-up reel having air layers in-between; computing a spring constant of the tape as a function of the number of unsupported wraps, a radius of the take-up reel and a nominal tape path length; and calibrating at least one unit of the tape transport system dependent on the spring constant.

In the following, embodiments of methods and devices relating to track-following control are described with reference to the enclosed drawings.

BRIEF DESCRIPTION OF THE SEVERAL VIEWS OF THE DRAWINGS

Similar or functionally similar elements in the figures have been allocated the same reference signs if not otherwise indicated.

DETAILED DESCRIPTION

Figure 1:
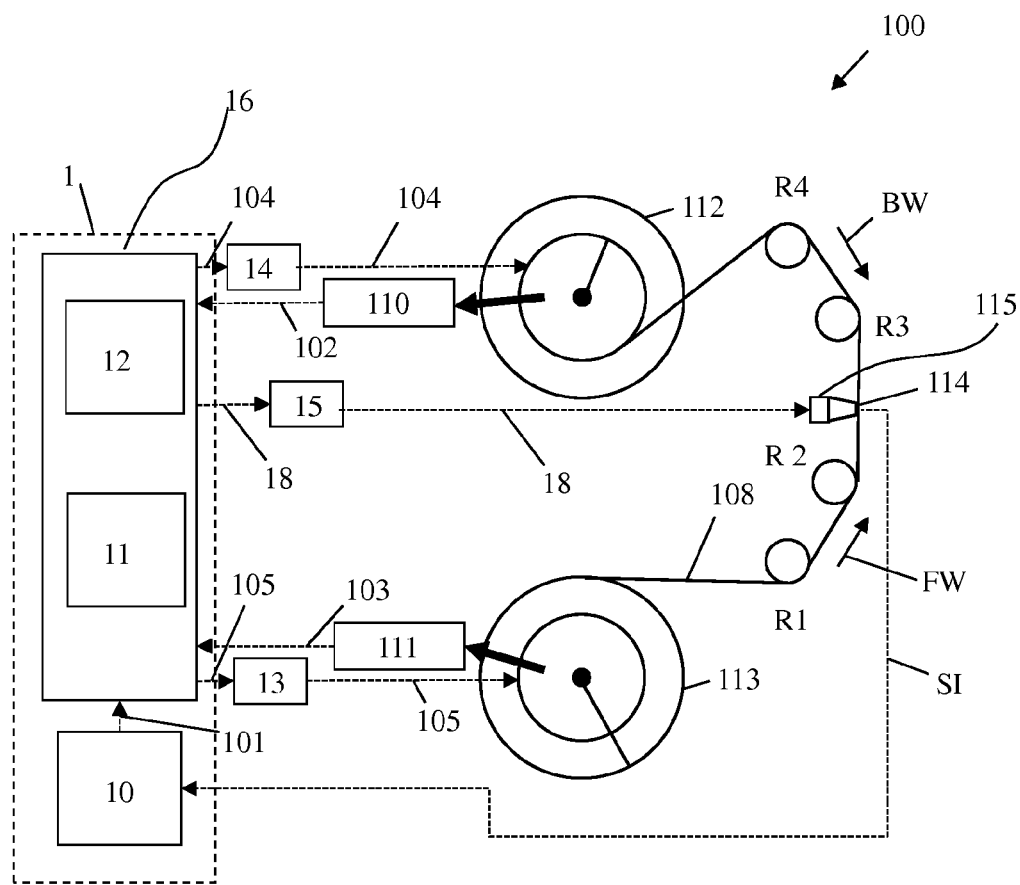
FIG. 1 shows a schematic block diagram of an embodiment of a tape transport system comprising a control device.

According to an embodiment of a first aspect, a control device for controlling the transport of a tape within a tape transport system is suggested. The tape transport system has a head operable to read data from and/or write data to the tape, a supply reel and a take-up reel, wherein the tape is moveable from the supply reel to the take-up reel. The control device comprises a determination unit having at least a first servo channel and a second servo channel for determining a first lateral position of the tape relative to the head from information of the first servo channel and a second lateral position of the tape relative to the head from information of the second servo channel, and for determining a lateral position difference between the first lateral position and the second lateral position, a computing unit for estimating a number of unsupported wraps of the tape as a function of the lateral position difference, wherein the number of unsupported wraps corresponds to the number of layers of the tape around the take-up reel having air layers in-between, and for computing a spring constant of the tape as a function of the number of unsupported wraps, a radius of the take-up reel and a nominal tape path length, and a calibration unit for calibrating at least one unit of the tape transport system dependent on the spring constant.

In tape transport systems, the tape is transported through a tape path from a cartridge (supply) reel to a machine (take-up) reel, or vice versa. Guiding through the tape path and across a head is performed by rolling elements, so called rollers. The head is coupled to an actuator, and dedicated servo transducers at the head read pre-formatted servo track information. Such a tape transport system includes two main control systems, one for tape transport and one for track-following. A tape transport control system is responsible for the transport of the tape within the tape transport system.

During track-following, i.e., positioning of the head in relation to the tape, a position error signal (PES), which is created as a function of the servo pattern on the tape, is used to measure the misalignment of the head relative to the data track locations. Subsequently, the PES is used by a track-following control system to position the head using an actuator to follow the data tracks in the presence of tape disturbances. The PES can be calculated by adding or subtracting the actual or estimated relative position of the head, i.e., the feedback signal of the track-following control system, to or from a track reference signal. The track reference signal comprises information in view of the target position of the head relative to the tape. The relative position of the head with respect to the tape is calculated as a function of the recorded servo pattern, which includes magnetic transitions with two different slopes. The position can be calculated from the relative timing of pulses generated by the head reading the servo pattern, i.e., the magnetic transitions.

The servo information used for the track-following control can also be used for determining a spring constant of the tape during an initial estimation of the spring constant and further parameters of the tape transport system and the tape. These parameters can be used to calibrate the tape transport system, i.e., to adjust for example the parameters of the controllers of the tape transport system based on a prior knowledge of characteristics of the tape transport system.

As already explained above, proper operation of the tape transport control system requires the knowledge of the parameter values that determine the characteristics of the tape transport plant and servo, for example of the tape spring constant, the tape damper coefficient, the driver gains that relate the control currents to the torque applied by the two reel motors, and/or the motor viscous friction coefficients. It is therefore desirable to devise methods for the estimation of these parameters, both at manufacturing time and prior to starting tape drive operation, as the parameters are subject to variations depending, for example, on the environmental conditions and on aging of the tape cartridge and the drive.

An estimation of the tape spring constant may be carried out by using the control device as described above. Based on the tape spring constant, which is varying as a function of the tape longitudinal position, further parameters of the tape transport system or the tape may be determined.

One idea of embodiments of the control device is based on the fact that the number of unsupported wraps of the tape which occur due to air entrainment is not necessarily constant over the entire length of the tape, i.e., is the same at the beginning of the tape and at the end of the tape, but varies from beginning of tape to end of tape as a function of a lateral position difference. Unsupported wraps in this context refer to the fact that the outer layers of the tape do not directly touch inner layers of the tape at a reel. Between the inner and outer layers, there is an air layer.

To estimate or compute the number of unsupported wraps, a difference between a first lateral position of the tape and a second lateral position of the tape is determined. The tape may comprise at least two servo bands that are recorded onto the medium embedding a data band. Each servo band contains servo frames, which are designed to extract essential information for track-following and tape transport servomechanisms, such as tape velocity, lateral head position, and longitudinal tape position. In tape systems, two dedicated servo readers are normally present in a head module, providing servo signals from which servo information is obtained by two servo channels, usually referred to as a dual servo channel. Based on these servo signals, the first lateral position and the second lateral position are determined and then used for determining the number of unsupported wraps.

Based on the fact of a varying number of unsupported wraps, the spring constant of the tape may be determined over the entire length of the tape with an improved accuracy. The spring constant depends inter alia on the number of unsupported wraps at the take-up reel, the radius of the take-up reel and the nominal tape path length.

According to an embodiment, the at least one unit is one of the group of a take-up reel controller, a supply reel controller, a skew controller and an actuator controller.

Also other controllers or units of the tape transport system can be calibrated as described above. The calibration can be used to adjust the controllers to actual conditions of the tape and the tape transport system.

According to a further embodiment, the determination unit is adapted to determine the tape dimensional stability of the tape as a function of the lateral position difference.

The tape dimensional stability (TDS) that can be computed based on the lateral position difference is an indicator for the number of unsupported wraps. Therefore, according to this embodiment, the number of unsupported wraps is computed as a function of the TDS that depends on the lateral position difference.

According to a further embodiment, the computing unit is adapted to compute the number of unsupported wraps of the tape dependent on a velocity of the tape at the head and a tension of the tape.

In order to accurately compute the number of unsupported wraps, a known or predetermined velocity of the tape and a known or predetermined tension of the tape, which corresponds to the known velocity, may be used. The velocity of the tape can be determined as a primary velocity which corresponds to the velocity of the tape at the head.

According to a further embodiment, the nominal tape path length is the tape path length between the take-up reel and the supply reel at zero velocity.

The length of the tape path at zero velocity can be easily determined. At nonzero velocities, the effective length of the tape path varies with the phenomenon of air entrainment, which takes place at the take-up reel. Thus, for the determination of the spring constant, the nominal tape path length, which is known, is varied based on the number of unsupported wraps.

According to a further embodiment, the computing unit is adapted to compute the spring constant of the tape dependent on the area of the cross section of the tape.

As the cross section of the tape also varies due to the varying tension of the tape, the area of the cross section is also taken into account when computing the spring constant. The area of the cross section can be divided by the nominal length of the tape path that is varied based on the number of unsupported wraps.

According to a further embodiment, the computing unit is adapted to compute the spring constant of the tape dependent on mechanical characteristics of the tape, in particular the elastic modulus of the tape.

The spring constant can be defined as the ratio of the elastic modulus times the area of the cross section divided by the effective tape path length, given by the nominal length of the tape path that is varied by the number of unsupported wraps.

The mechanical characteristics of the tape can be the elasticity of the tape. The elasticity can be defined by the Young's modulus, also known as the tensile modulus or elastic modulus, which is a measure of the stiffness of an elastic material and is a quantity used to characterize materials.

According to a further embodiment, the calibration unit is adapted to calibrate reel controllers of the take-up reel and the supply reel and/or an actuator controller.

Based on the determined spring constant, the tape transport system can be calibrated. Also further parameters of the tape transport system can be determined. Based on all determined parameters, the accuracy of the tape transport system can be improved by calibrating the parameters of the controllers controlling the reels and the actuator dependent on the actual characteristics of the tape transport system. The calibration can be repeated periodically in order to take into account aging of the system parts or changing environmental conditions.

According to a further embodiment, the control device is adapted to control the units of the tape transport system dependent on the calibration.

The control device can also use the determined parameters like the spring constant for the control during the operation of the tape transport system. As some characteristics change with or during operation, additional information may be needed like information from the servo channels.

According to an embodiment of a second aspect, a tape transport system is suggested. The tape transport system comprises a head operable to read data from and/or write data to the tape, and a control device as described above for calibrating at least one unit of the tape transport system.

The at least one unit is one of the group of a take-up reel controller, a supply reel controller, a skew controller and an actuator controller. These controllers can be controlled by the control device, i.e., can receive control currents or signals from the control device, which are generated based on the calibration.

According to an embodiment of a third aspect, a method for controlling the transport of a tape within a tape transport system is suggested. The tape transport system has a head operable to read data from and/or write data to the tape, a supply reel and a take-up reel, wherein the tape is moveable from the supply reel to the take-up reel, wherein the tape system comprises a control device comprising a determination unit having at least a first servo channel and a second servo channel. The method comprises the following steps: determining a first lateral position of the tape relative to the head from information of the first servo channel and a second lateral position of the tape relative to the head from information of the second servo channel, determining a lateral position difference between the first lateral position and the second lateral position, estimating a number of unsupported wraps of the tape as a function of the lateral position difference, wherein the number of unsupported wraps corresponds to the number of layers of the tape around the take-up reel having air layers in-between, computing a spring constant of the tape as a function of the number of unsupported wraps, a radius of the take-up reel and a nominal tape path length, and calibrating at least one unit of the tape transport system dependent on the spring constant.

According to an embodiment, computing the number of unsupported wraps as a function of the difference of the lateral position comprises computing the number of unsupported wraps as a function of tape parameters, a, b, which depend on the tape medium, the velocity of the tape and the tension of the tape.

The number of unsupported wraps varies with the velocity and the tension of the tape. Further, the spring constant of the tape depends on the tape medium, i.e., the characteristics of the tape like material. Thus, to improve the estimation of the number of unsupported wraps and thus the determination of the spring constant, these variables may also be taken into account. For example, n_eff as the effective number of unsupported wraps may be calculated as:

$$n\_\textit{eff} = f(\Delta y), \text{ wherein } f(\Delta y) = a + b*\Delta y,$$

wherein $\Delta y$ corresponds to the lateral position difference.

As discussed, the parameters a and b depend on the tape medium, the velocity of the tape and the tension of the tape.

According to a further embodiment, the method further comprises determining the tape parameters by modulating at least one control current at least two tape longitudinal positions by applying a signal having a waveform with predefined spectral characteristic, determining a resonance frequency of a tape path, estimating the spring constant at the tape longitudinal positions, and determining the tape parameters from the at least two measured tape spring constant values.

According to this embodiment, a waveform, for example a chirp signal, is applied to at least one of the control currents, which control the reels. Based on the resonance frequency, assertions in view of spring constant values at specific positions of the tape can be made. The tape parameters, which are needed for the above equation, can be calculated based on these spring constant values. The spring constant $K_T$ can then be computed as a function of the longitudinal position, using $\Delta y$ depending on the tape parameters.

According to a further embodiment, determining a resonance frequency of the tape path comprises monitoring the tape tension response during the application of the waveform.

According to this embodiment, the tape tension response is monitored. The tension variation can be observed by computing the difference between the lateral position estimates, while a chirp signal is applied to one of the control currents during closed-loop operation of the tape transport servomechanism at the beginning of the tape. The time instant at which the tension signal envelope exhibits a peak may provide information about the resonance frequency of the tension response, which is related to the spring constant. The ratio of the envelope peak and the value of the tension signal envelope at a given time interval after the peak is related to the damper coefficient. The estimates of the tape spring constant and damper coefficient at the beginning of the tape can then be used to compute estimates of the spring constant and the damper coefficient over the entire length of the tape as described above.

According to a further embodiment, estimating the spring constant at the known tape longitudinal positions comprises mapping the resonance frequency to the radius of the take-up reel.

As described above, the spring constant over the entire length of the tape, i.e., from beginning of tape to end of tape, depends on the radius of the take-up reel. It should be noted that the radius of the supply reel and the reel inertia may be readily derived from the radius of the take-up reel. Estimates of further drive parameters can be obtained by a minimization of a cost function that is based on the comparison of identified and parameter-dependent frequency responses.

According to an embodiment of a fourth aspect, a computer program is suggested. The computer program comprises a program code for executing the method as described above for controlling the transport of a tape within a tape transport system when run on at least one computer.

The program code may be configured to implement further aspects or steps of the method for allocating energy to devices. The program code can be distributed among the elements forming the system.

The computer program product, for instance, includes computer readable code for implementing aspects of the method for controlling the transport of a tape within a tape transport system depicted above.

Certain embodiments of the presented control device, the tape transport system, the control method or the computer program may comprise individual or combined features, method steps or aspects as mentioned above or below with respect to exemplary embodiments.

FIG. 1 shows a tape transport system 100 which is used for transporting a tape 108 in order to perform read, write, seek, or other operations on the tape 108. The tape transport system 100 has a head 114 operable to read data from and/or write data to the tape 108. An outboard reel 113 and an inboard reel 112 are used to transport or move the tape 108 from the outboard reel 113 to the inboard reel 112 in forward direction (FW), and from the inboard reel 112 to the outboard reel 113 in reverse or backward direction (BW). The tape 108 is guided over rollers R1-R4. Sensors 110 and 111 can be used to provide secondary velocities 102, 103 or other reel information measured by the sensors 110 and 111. The secondary velocities 102, 103 correspond to velocities of the tape 108 at the respective reel 112, 113. The sensors 110, 111 can be for example Hall sensors. The arrow FW denotes a nominal forward direction of the tape 108, and BW a movement in the reverse direction. In forward mode, the outboard reel 113 functions as a supply reel. The tape 108 is supplied from the outboard reel 113, via rollers R1, R2 to the head 114 via rollers R3, R4 to the inboard reel 112, which functions as the take-up reel, where tape 108 is wound up again. The tape 108 runs along a forward path as indicated.

The head 114 reads servo information SI from the tape 108. The servo information SI is provided to a dual servo channel (not shown). The dual servo channel provides inter alia a primary velocity 101 derived from the servo information SI to a control device 1. In addition, the dual servo channel provides data relating to the servo information SI to a determination unit 10, which is implemented to determine a first lateral position of the tape 108 and a second lateral position of the tape 108. Based on this position information, the determination unit 10 determines a lateral position difference ($\Delta y$). A computing unit 11 receives the lateral position difference as signal 101 and computes a number of unsupported wraps of the tape 108 as a function of the lateral position difference. A calibration unit 12 calibrates for instance the reel controllers 13, 14 or the actuator controller 15 based on the number of unsupported wraps.

After the calibration, a main controller 16 can then control the operation of the tape transport system 100 during normal operation. The calibration can be repeated periodically.

The actuator controller 15 for instance is implemented to adjust the position of the head 114 by forwarding a control signal 18 as actuator input signal 18 to an actuator 115 being coupled to the head 114. The actuator 115 is controlled by means of the control signal 18. The main controller 16 is adapted to control the inboard reel 112 and the outboard reel 113 via control signals 104, 105. The control signals 104, 105 may comprise for instance information about the speed of the reels 112, 113.

As a high track density on the tape 108 is desirable in order to achieve a higher capacity, it is desirable to accurately calibrate the tape transport system 100 before normal operation. As already described, the tape transport system 100 is responsible for adjusting the parameters of the controllers 13, 14, 15. This control should be adjusted to actual characteristics of the tape transport system 100, which are determined using the units 10-12. Based on these units, a calibration may be performed.

As discussed above, reliable measurements of system parameters, such as tape velocity and longitudinal position, are usually obtained in tape systems 100 by reading servo bands 21-25 that are prewritten on the tape 108 during the tape manufacturing, and from which servo information can be extracted.

Figure 2:
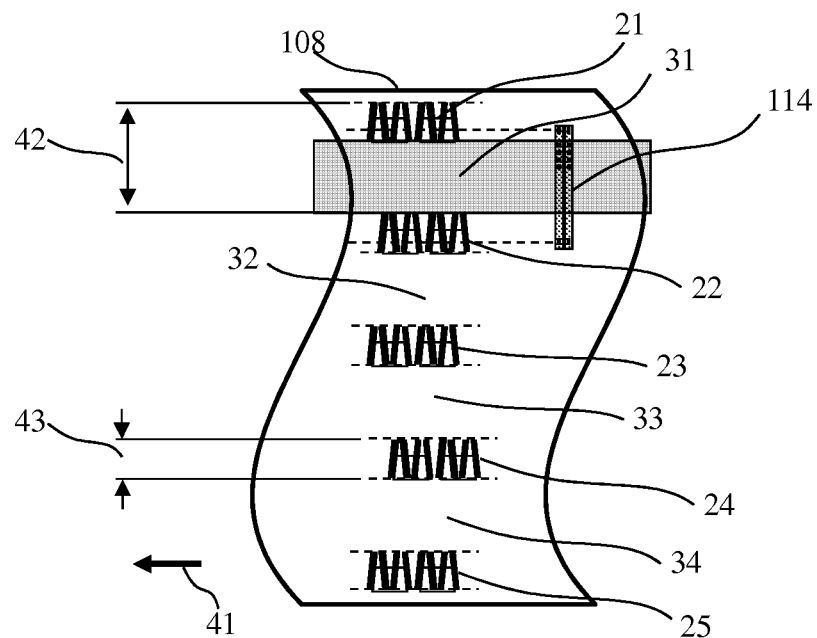
FIG. 2 shows a schematic block diagram of a tape used in the tape transport system of FIG. 1.

For example as shown in FIG. 2, in current linear tape open (LTO) drives, five dedicated servo bands 21-25 are recorded onto the medium 108 embedding four data bands 31-34. Each servo band 21-25 contains servo frames, which are designed to extract essential information for track-following and tape transport servomechanisms, such as tape velocity, lateral head position, and longitudinal tape position. In tape systems 100, two dedicated servo readers are normally present in a head module 114, providing servo signals from which servo information is obtained by two servo channels in the determination unit 10, usually referred to as a dual servo channel. In the case shown in FIG. 2, the two servo signals processed by the dual servo channel are provided by the servo bands 21 and 22. Each servo band 21-25 has a specific servo band width 43. One servo band 21 and one data band 31 provide a servo band pitch 42. Here, the tape 108 is moved from right to left, indicated by the arrow 41.

Figure 3:
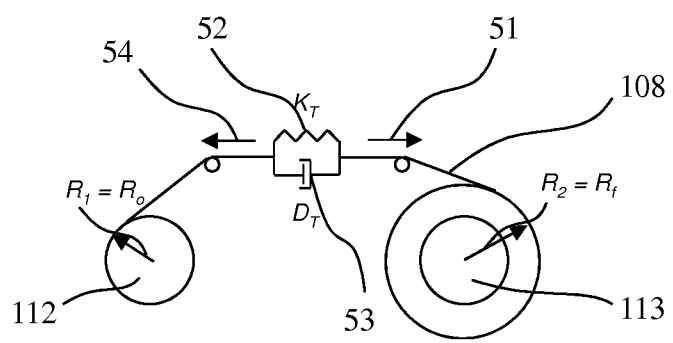
FIG. 3 shows a schematic block diagram of a section of the tape transport system of FIG. 1 with a tape motion in forward direction.

The tape transport system model is depicted in FIG. 3. In the following, a possible method for calculating the spring constant will be provided.

The mechanical behavior of the system is governed by the following second-order differential equations, obtained by equating the change in angular momentum to the sum of torques for each reel 112, 113:

$$\frac{J_1}{R_1} \ddot{x}_1(t) = \tag{1}$$
$$-R_1(1+\mu)\{K_T[x_1(t) - x_2(t)] + D_T[\dot{x}_1(t) - \dot{x}_2(t)]\} - \frac{\beta_1}{R_1}\dot{x}_1(t) + K_1 u_1(t)$$

$$\frac{J_2}{R_2} \ddot{x}_2(t) = \tag{2}$$
$$R_2\{K_T[x_1(t) - x_2(t)] + D_T[\dot{x}_1(t) - \dot{x}_2(t)]\} - \frac{\beta_2}{R_2}\dot{x}_2(t) + K_2 u_2(t),$$

where the state vector of the fourth-order reel-to-reel system 100 is given by:

$$x(t) = \begin{bmatrix} x_1(t) \\ \dot{x}_1(t) \\ x_2(t) \\ \dot{x}_2(t) \end{bmatrix} = \begin{bmatrix} \text{tape position at machine reel (1)} \\ \text{tape velocity at machine reel (1)} \\ \text{tape position at file reel (2)} \\ \text{tape velocity at file reel (2)} \end{bmatrix}. \tag{3}$$

The moment of inertia of the machine (or inboard or take-up) reel 112 with radius R1 and that of the file (or outboard or supply) reel 113 with radius R2 are denoted by J1 and J2, respectively, depend on the longitudinal position l, and are expressed as $$J_1 = J_{1,motor} + \pi w \rho \left( \frac{R_1^4 - R_0^4}{2} \right) \tag{4}$$

and $$J_2 = J_{2,motor} + \pi w \rho \left( \frac{R_2^4 - R_0^4}{2} \right), \tag{5}$$

where $J_{1,motor}$ and $J_{2,motor}$ are constant depending on the system 100. The externally applied torque for each reel 112, 113 is given by the product of the motor control signal $u_i(t)$ and the motor driver gain $K_i$, i=1, 2. The relevant system parameters are defined as follows:

$K_T$: tape spring constant [N/m] (52 in FIG. 3),
$D_T$: tape damper coefficient [N s/m] (53 in FIG. 3),
$\mu$: Coulomb friction coefficient (51 in FIG. 3),
$\rho$: tape density [Kg/m3],
w: tape width [m],
$R_0$: radius of empty reel [m],
$R_f$: radius of full reel [m],
$K_1$, $K_2$: motor driver gains [N m/A],
$\beta_1$, $\beta_2$: motor viscous friction coefficients [N m s].

It should be noted that the time dependency of the various parameters, e.g., the reel radii and inertia, has not been explicitly shown in (1) and (2). Also it should be noted that a further dependency on tape velocity (54 in FIG. 3), tension, and longitudinal position is introduced by the phenomenon of air entrainment, which takes place in the take-up reel 112 during tape motion, and modifies the effective length of the tape path, thereby also determining a variation of the parameters $K_T$ and $D_T$. By defining the vector of control signals as $$u(t) = \begin{bmatrix} u_1(t) \\ u_2(t) \end{bmatrix}, \tag{6}$$

the differential equations (1) and (2) are expressed in state-space form as $$\dot{x}(t) = Fx(t) + Gu(t), \tag{7}$$

where $$F = \begin{bmatrix} 0 & 1 & 0 & 0 \\ \frac{-(1+\mu)R_1^2 K_T}{J_1} & \frac{-(1+\mu)R_1^2 D_T - \beta_1}{J_1} & \frac{(1+\mu)R_1^2 K_T}{J_1} & \frac{(1+\mu)R_1^2 D_T}{J_1} \\ 0 & 0 & 0 & 1 \\ \frac{R_2^2 K_T}{J_2} & \frac{R_2^2 D_T}{J_2} & \frac{-R_2^2 K_T}{J_2} & \frac{-R_2^2 D_T - \beta_2}{J_2} \end{bmatrix}$$

and

-continued $$G = \begin{bmatrix} 0 & 0 \\ \frac{R_1 K_1}{J_1} & 0 \\ 0 & 0 \\ 0 & \frac{R_2 K_2}{J_2} \end{bmatrix}.$$

The tape transport output signals are expressed in terms of the state vector as $$y(t) = \begin{bmatrix} \hat{v}_{H,1}(t) \\ \hat{v}_{H,2}(t) \\ \hat{v}(t) \\ \hat{\tau}(t) \end{bmatrix} = Hx(t) + w(t), \quad (8)$$

where $$H = \begin{bmatrix} 0 & 1 & 0 & 0 \\ 0 & 0 & 0 & 1 \\ 0 & \alpha & 0 & \beta \\ K_T & D_T & -K_T & -D_T \end{bmatrix},$$

and where $\hat{v}_{H,1}(t)$ and $\hat{v}_{H,2}(t)$ denote the tape velocity at the machine and file reel, respectively, $\hat{v}(t)$ denotes the tape velocity at the head, $\hat{\tau}(t)$ is the tape tension, and $w(t)$ denotes the measurement noise vector. In the forward direction of tape motion, $\alpha=0$ and $\beta=1$, whereas in the reverse direction $\alpha=1$ and $\beta=0$. The values of $\alpha$ and $\beta$ indicate that in the steady state the frequency responses from the input currents to the primary tape velocity closely match the responses from the input currents to the secondary tape velocity at the supply reel.

The matrices $F(4\times4)$, $G(4\times2)$, and $H(4\times4)$ yield the state-space representation of the tape transport system. It should be noted that the dependencies on time, velocity, and longitudinal position are not explicitly indicated. Also note that $\hat{v}_{H,1}(t)$ and $\hat{v}_{H,2}(t)$ are usually referred to as secondary velocities, whereas $\hat{v}(t)$ is referred to as primary velocity.

With reference to FIG. 1, the estimates of $\hat{v}_{H,1}(t)$ and $\hat{v}_{H,2}(t)$ are provided by the Hall sensors 110 and 111, whereas the estimate of $\hat{v}(t)$ is yielded by the dual servo channel. The estimate of $\hat{\tau}(t)$ is obtained by an approach, which is based on the lateral position measurements by the dual servo channel. The assumption is that in the observed time interval the tape length change in the transversal direction, $\Delta l_T$, measured by the two servo readers within the two adjacent servo bands, is determined only by tape tension variation and not by other tape dimensional stability or tape formatting effects. Recalling Hooke's law, the change $\Delta l_T$, which is due to the deviation $\Delta \tau$ of the applied tension from the nominal value, and is evaluated relative to one of the N data bands on a tape, is expressed as $$\Delta \ell_T = -v \frac{\Delta \tau}{NuE}, \quad (10)$$

where $v$, $E$, and $u$ denote the Poisson's ratio, the Young's modulus, and the thickness of the tape 108, respectively. As the variation of tape length in the transversal direction within one data band 31-34 is given by $$\Delta l_T = y_1 - y_0$$

where $y_1$ and $y_0$ denote the lateral positions of the servo readers measured by the dual servo channel, the estimate of the tape tension can be expressed as $$\hat{\tau} = \tau_{nom} - \frac{4uE(y_1 - y_0)}{v}, \quad (11)$$

where $\tau_{nom}$ denotes the nominal value of the tape tension. It should be noted that the values of the reel radii are readily obtained from the longitudinal position estimate, defined as $\hat{l}(t)$, which is also provided by the dual servo channel. The output signals of the tape transport system are then sampled with sampling interval $T_s$ to yield the discrete-time estimates $\hat{v}_{H,1}(t_m)$, $\hat{v}_{H,2}(t_m)$, $\hat{\tau}_{H,2}(t_m)$, and $\hat{l}(t)$ at the time instants $t_m = mT_s$.

The required estimates of tape spring constant and damper coefficient may be obtained as follows. A chirp signal, which sweeps the frequency spectrum from $f_1$ to $f_2$ over an interval of $T_C$ seconds, is superimposed to the machine reel or to the file reel motor input signal, while the tape transport servomechanism is operated in closed loop at certain nominal tape velocity $v_0$ and tension $\tau_0$ at the beginning of tape in forward or reverse direction. It should be noted that the system parameters are slowly time-varying and are assumed constant during the application of a chirp signal. During the application of the chirp, the motor input signals $u_1(t_m)$ and $u_2(t_m)$, the estimates of the output signals $\hat{v}_{H,1}(t)$, $\hat{v}_{H,2}(t)$, $\hat{v}(t)$, $\hat{\tau}(t)$, and $\hat{l}(t_m)$, and the values of the reel radii $R_1(t)$ and $R_2(t)$ are recorded. Observing the state space realization (7), and assuming that the Coulomb friction coefficient $\mu$ and the motor viscous friction coefficients $\beta_1$, $\beta_2$ are negligible, the characteristic equation of the tape transport dynamics is given by $$s^2 + s D_T \left(\frac{R_1^2}{J_1} + \frac{R_2^2}{J_2}\right) + K_T \left(\frac{R_1^2}{J_1} + \frac{R_2^2}{J_2}\right) = 0$$

which indicates the resonance frequency $\omega_0$ of the tension response is approximated as $$\omega_0 \approx \sqrt{K_T \left(\frac{R_1^2}{J_1} + \frac{R_2^2}{J_2}\right)}.$$

By monitoring the tension variation estimate $\hat{\tau}(t)$, and measuring the time interval from the application of the chirp signal to the occurrence of a peak of the amplitude of tension oscillations $A_\tau(t_0)$ at time $t_0$, an estimate $\omega_0$ of the resonance frequency at the beginning of the tape 108, i.e., for $l \approx 0$, is obtained. An estimate of the tape spring constant is thus given by $$\hat{K}_T(0; v_0, \tau_0) = \frac{\omega_0^2}{\frac{R_1^2}{J_1} + \frac{R_2^2}{J_2}}$$

Assuming that the behavior of the tension response approximates that of a second order system in a neighborhood of the resonance frequency, an estimate of the tape damper coefficient is obtained as $$\hat{D}_T(0; v_0, \tau_0) = \frac{\hat{K}_T(0; v_0, \tau_0)}{\omega_0} \frac{\left(\frac{\omega_1}{\omega_0}\right)^2 - 1}{\sqrt{\left(\frac{A_\tau(t_0)}{A_\tau(t_1)}\right)^2 - \left(\frac{\omega_1}{\omega_0}\right)^2}},$$

where $A_\tau(t_1)$ and $\omega_1$ denote the amplitude of tension oscillations and the chirp frequency at time $t_1 = t_0 + \Delta t$, with $0 < \Delta t < T_C - t_0$. It should be noted that the interval $\Delta t$ must be chosen such that the condition $$\frac{A_\tau(t_0)}{A_\tau(t_1)} > \frac{\omega_1}{\omega_0}$$

is satisfied.

The behavior of the tape spring constant as a function of longitudinal position may be obtained by observing that, assuming air is uncompressible and tape pack stress is negligible, the number of floating wraps n due to air entrainment is independent of the longitudinal position. In forward tape motion, the effective unsupported tape length $L_u$ can thus be expressed as $$L_u(\ell; v, \tau) = E \frac{S}{K_T(\ell; v, \tau)} = L_0 + 2\pi R_1(\ell) n(v, \tau),$$

where $L_0$ is the nominal tape path length and S is the area of the tape cross section. Hence, the tape spring constant can be estimated at any longitudinal position for velocity $v_0$ and tension $\tau_0$ as $$\hat{K}_T(\ell; v_0, \tau_0) = \frac{ES}{L_0 + \frac{R_1(\ell)}{R_1(0)} \left(\frac{ES}{\hat{K}_T(0; v_0, \tau_0)} - L_0\right)}.$$

Assuming that the tape damper coefficient has the same dependency on the effective tape path length as the tape spring constant, the damper coefficient is estimated at any longitudinal position for velocity $v_0$ and tension $\tau_0$ as $$\hat{D}_T(\ell; v_0, \tau_0) = \hat{D}_T(0; v_0, \tau_0) \frac{\hat{K}_T(\ell; v_0, \tau_0)}{\hat{K}_T(0; v_0, \tau_0)}.$$

Once the tape spring constant and damper coefficient have been obtained, other tape drive parameters can be estimated by solving a minimization problem in the frequency domain. The required frequency responses are obtained as follows. In a first pass, which corresponds to the already performed step for estimating the spring constant, a chirp signal, which sweeps the frequency spectrum from $f_1$ to $f_2$ over an interval of $T_C$ seconds, is superimposed to the machine reel motor input signal, while the tape transport servomechanism is operated in closed loop at certain nominal tape velocity at the beginning of the tape 108. After rewinding the tape 108, in a second pass, while the tape 108 is moved at the same nominal velocity and tension, the chirp signal is superimposed to the file reel motor input signal 105, so that the sweeping of the spectrum takes place at the same longitudinal position in the two passes. The same procedure is then repeated at a number of tape velocities and tensions in a certain range, for both forward and reverse direction of tape motion. During each pass, the motor input signals $u_1(t_m)$ and $u_2(t_m)$, the estimates of the output signals $\hat{v}_{H,1}(t)$, $\hat{v}_{H,2}(t)$, $\hat{v}(t)$ and $\hat{\tau}(t)$ and the values of the reel radii $R_1(t)$ and $R_2(t)$ are recorded. In the following, an upper case letter indicates the Discrete Fourier Transform (DFT) of a signal that is computed over an interval, during which the chirp is applied. Furthermore, the subscript C1 indicates that a signal is recorded while the chirp is applied to the machine reel 112, whereas the subscript C2 indicates that the signal is recorded while the chirp is applied to the file reel 113. For specific values of tape velocity, tension, and longitudinal position, the frequency responses from input motor currents to secondary velocities, primary velocity, and tension are given by $$\begin{bmatrix} G_{u1,vH1}(f) \\ G_{u2,vH1}(f) \end{bmatrix} = \begin{bmatrix} U_{1,C1}(f) & U_{2,C1}(f) \\ U_{1,C2}(f) & U_{2,C2}(f) \end{bmatrix}^{-1} \begin{bmatrix} V_{H1,C1}(f) \\ V_{H1,C2}(f) \end{bmatrix}, \begin{bmatrix} G_{u1,vH2}(f) \\ G_{u2,vH2}(f) \end{bmatrix} =$$

$$\begin{bmatrix} U_{1,C1}(f) & U_{2,C1}(f) \\ U_{1,C2}(f) & U_{2,C2}(f) \end{bmatrix}^{-1} \begin{bmatrix} V_{H2,C1}(f) \\ V_{H2,C2}(f) \end{bmatrix}, \begin{bmatrix} G_{u1,v}(f) \\ G_{u2,v}(f) \end{bmatrix} = \begin{bmatrix} U_{1,C1}(f) & U_{2,C1}(f) \\ U_{1,C2}(f) & U_{2,C2}(f) \end{bmatrix}^{-1} \begin{bmatrix} V_{C1}(f) \\ V_{C2}(f) \end{bmatrix},$$

and $$\begin{bmatrix} G_{u1,\tau}(f) \\ G_{u2,\tau}(f) \end{bmatrix} = \begin{bmatrix} U_{1,C1}(f) & U_{2,C1}(f) \\ U_{1,C2}(f) & U_{2,C2}(f) \end{bmatrix}^{-1} \begin{bmatrix} T_{C1}(f) \\ T_{C2}(f) \end{bmatrix},$$

respectively.

For example, the estimates of the reel motor gain parameters $K_1$ and $K_2$ for nominal tape velocity $v_0$, tension $\tau_0$, and longitudinal position $l_0$, are obtained by the minimization of the cost function $$\begin{bmatrix} \hat{K}_1(v_0, \tau_0, \ell_0) \\ \hat{K}_2(v_0, \tau_0, \ell_0) \end{bmatrix} =$$

$$\min_{\substack{K_1 > 0 \\ K_2 > 0}} \left\{ \left\| \begin{bmatrix} G_{u1,v}(f) \\ G_{u2,v}(f) \end{bmatrix} - \begin{bmatrix} \hat{G}_{u1,v}(f; K_1, K_2) \\ \hat{G}_{u2,v}(f; K_1, K_2) \end{bmatrix} \right\| + \kappa \left\| \begin{bmatrix} G_{u1,\tau}(f) \\ G_{u2,\tau}(f) \end{bmatrix} - \begin{bmatrix} \hat{G}_{u1,\tau}(f; K_1, K_2) \\ \hat{G}_{u2,\tau}(f; K_1, K_2) \end{bmatrix} \right\| \right\}$$

where $\hat{G}_{u1,v}$, $\hat{G}_{u2,v}$, $\hat{G}_{u1,\tau}$, $\hat{G}_{u2,\tau}$ denote the frequency responses from input currents to tape velocity and tension that are computed from the model of equations (7) and (8) by using the estimates of the parameters $K_T$ and $D_T$, and nominal values of tape velocity, tension, and longitudinal position, and κ is a nonnegative constant.

The above observations and assumptions are now discussed with reference to FIGS. 4 to 10, illustrating the behavior of the spring constant in the cases of constant reference tension or ramp reference tension applied during transport of a thin tape, having a thickness of approximately 6 um.

Figure 4:
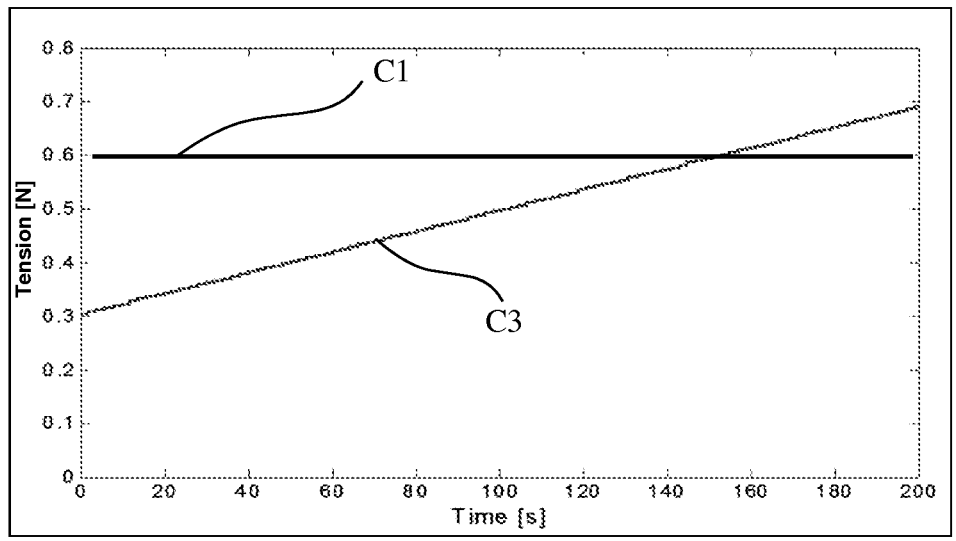
FIG. 4, FIG. 5, FIG. 6 and FIG. 7 show graphs illustrating a reference tension and tape dimensional stability in forward and reverse direction.
Figure 5:
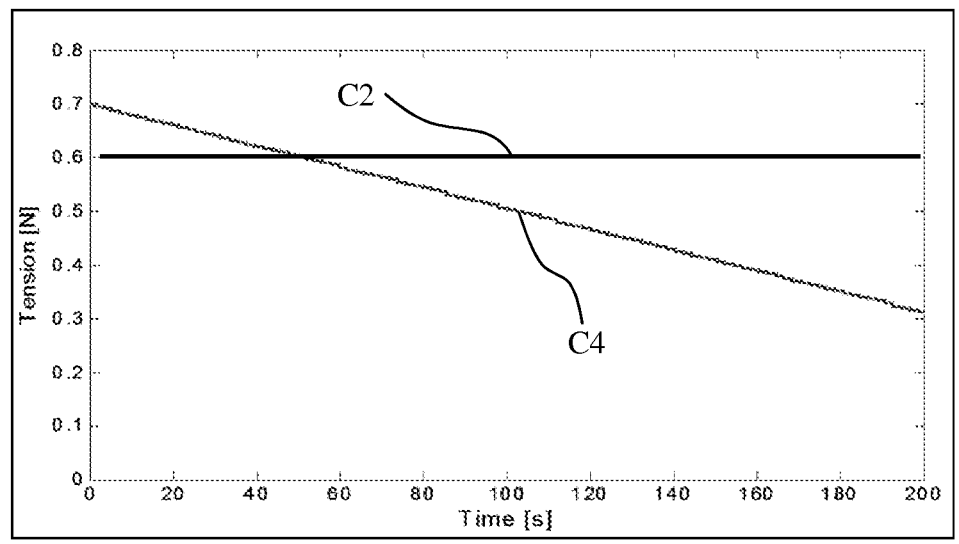
Figure 6:
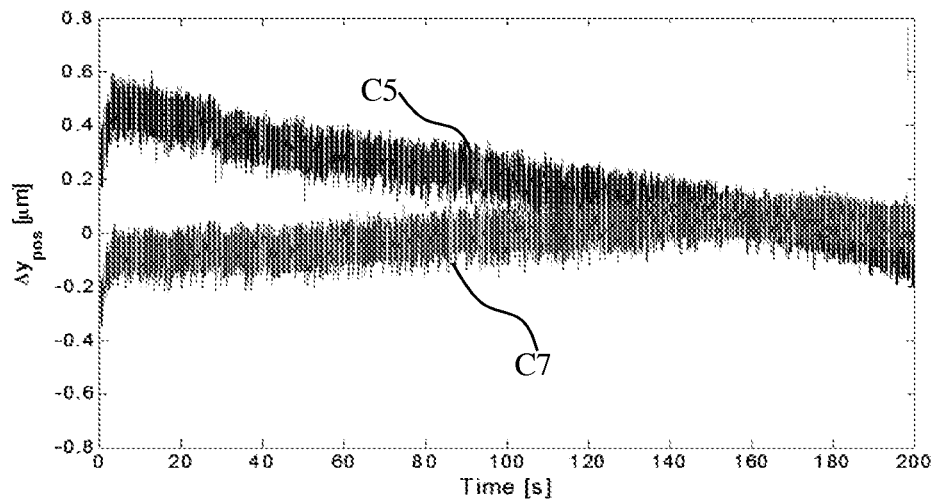
Figure 7:
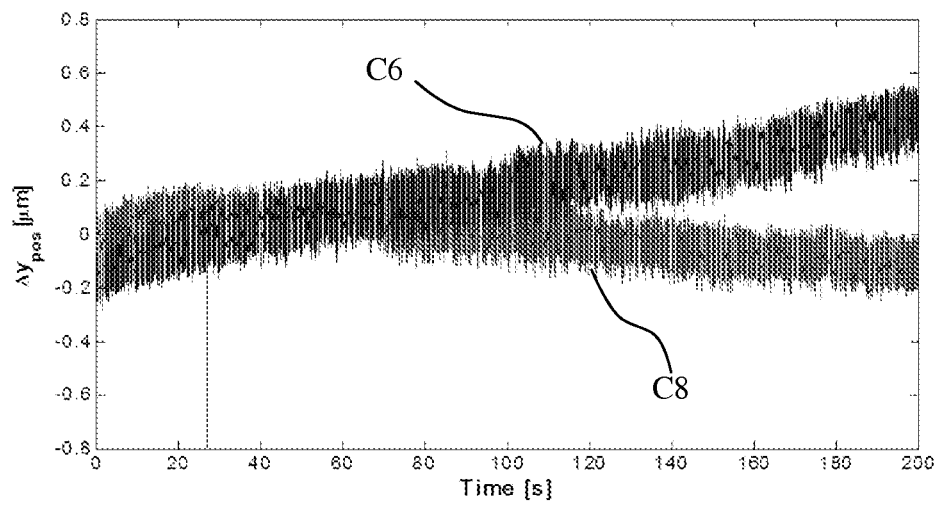

As can be seen in FIG. 4 (forward direction) and FIG. 5 (reverse direction), a constant reference tension of the tape 108 is applied (curves C1, C2). As the tape dimensional stability (TDS) varies (curves C5 in forward direction and C6 in reverse direction shown in FIGS. 6 and 7) for a constant reference tension, a ramp reference tension C3, C4 can be applied to compensate for the varying tape dimensional stability (curves C7 in forward direction and C8 in reverse direction shown in FIGS. 6 and 7).

Figure 8:
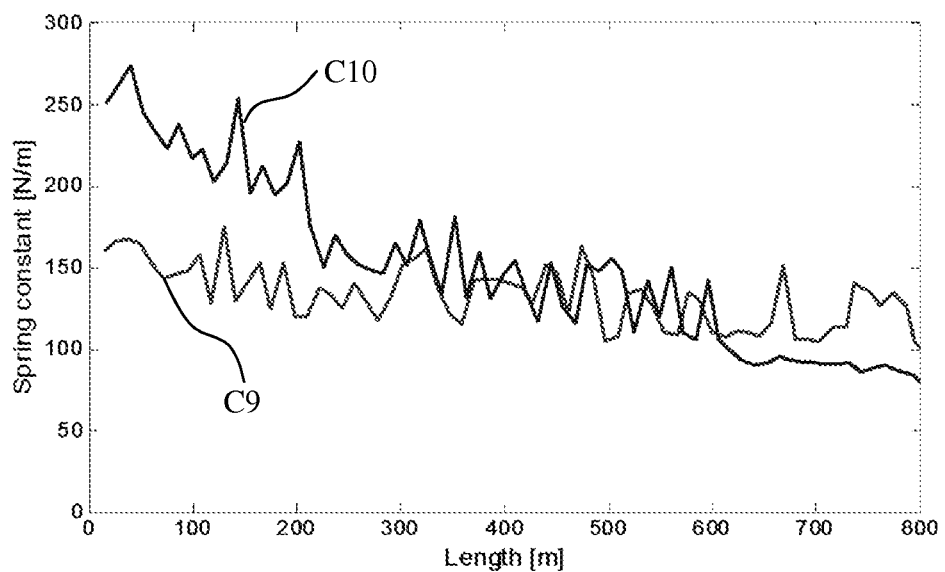
FIG. 8 and FIG. 9 show graphs illustrating a comparison of spring constant estimates in forward and reverse direction, without applied ramp reference tension and with applied ramp reference tension.

However, when estimating the spring constant as shown in FIG. 8, the spring constant obtained by PES-based tension estimates does not exhibit the same behavior in forward (C10) and reverse (C9) direction. In the case as shown here, the spring constant deviates from the behavior predicted by the air entrainment model considering a constant number of unsupported wraps, if a constant reference tension is applied.

Figure 9:
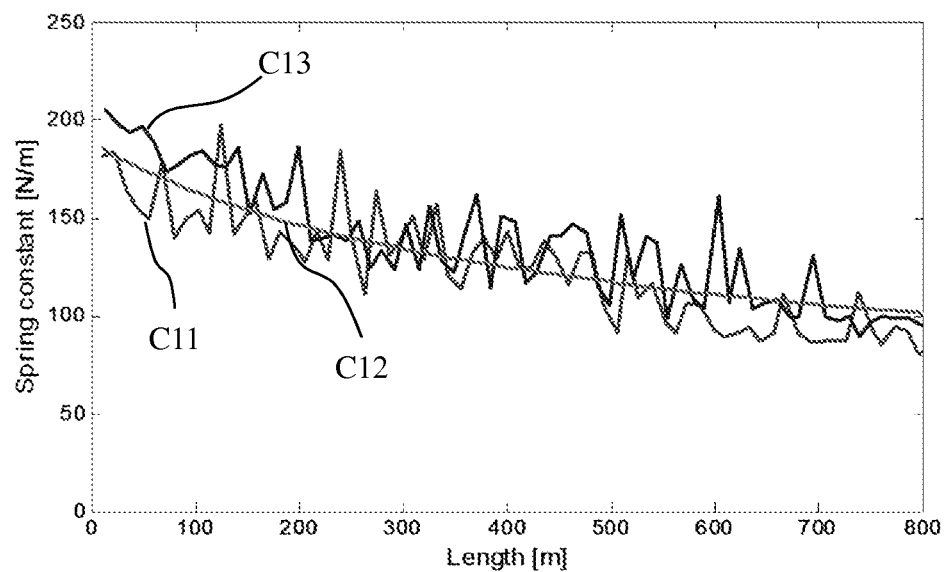

As shown in FIG. 9, if a ramp reference tension is applied, the spring constant obtained by PES-based tension estimates exhibits the same behavior in both forward (C13) and reverse (C11) direction. As can be seen based on curve C12, the spring constant behavior is well predicted by the air entrainment model with a constant number n of unsupported wraps over the entire length of the tape with an applied ramp reference tension. Without ramp reference tension, the spring constant behavior cannot be well predicted by the model.

Figure 10:
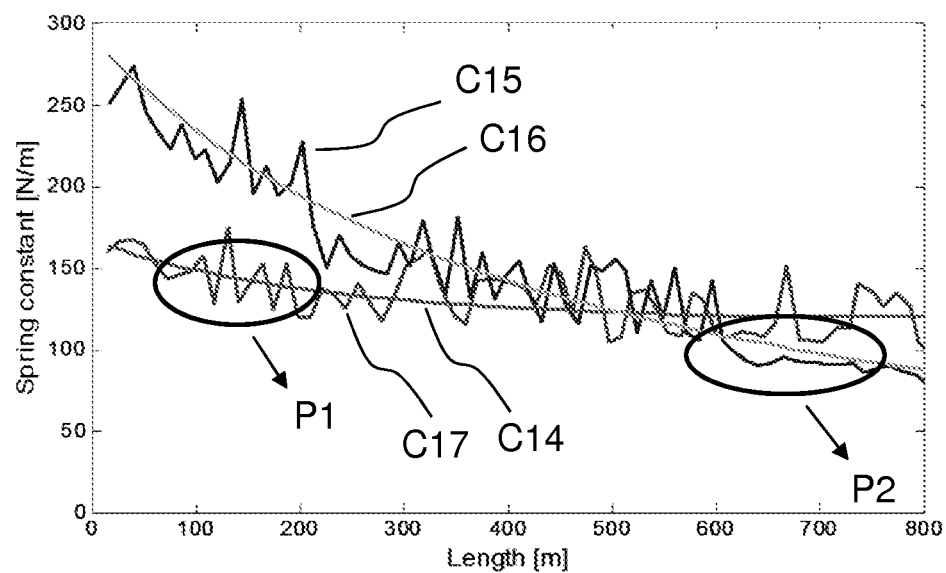
FIG. 10 shows a graph illustrating a comparison of spring constant estimates in forward and reverse direction when taking into account the number of unsupported wraps.

As shown in FIG. 10, where the curves C9 and C10 of FIG. 8 are replicated as curves C17 and C15, respectively, a satisfactory prediction of the behavior of the spring constant may be achieved in the case of a constant reference tension by relaxing the assumption of a constant number of unsupported wraps. Curve C15 shows the forward behavior of the spring constant, C16 the forward behavior predicted by considering a varying number of unsupported wraps. Curve C17 shows the reverse behavior of the spring constant, C14 the reverse behavior predicted by considering a varying number of unsupported wraps.

With nominal reference tension, the spring constant behavior is well predicted by a number n of unsupported tape wraps due to air entrainment that varies linearly with tape length. In the shown case, TDS also varies approximately linearly with the tape length. Note that n corresponds to the values obtained in the case of TDS compensation by a ramp reference tension shown in FIG. 9, in regions P1 and P2 shown in FIG. 10 (P1 for reverse direction, P2 for forward direction) where the ramp reference tension is close to the nominal tension of 0.6 N.

Figure 11:
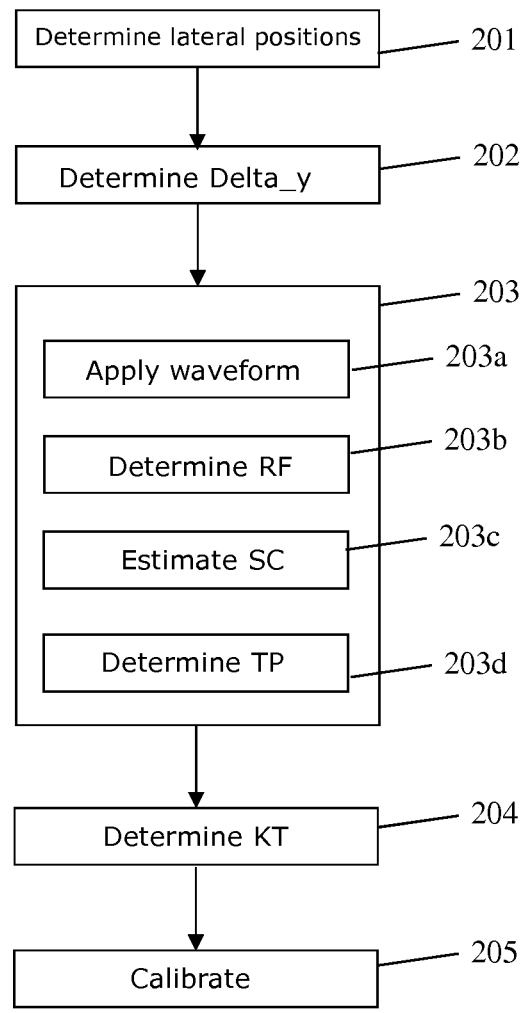
FIG. 11 shows an embodiment of a sequence of method steps for controlling the transport of a tape within a tape transport system.

A method for controlling the transport of a tape 108 within a tape transport system 100 is shown in FIG. 11. In a first step 201, a first lateral position of the tape 108 relative to the head 114 is determined from information of the first servo channel within determination unit 10 and a second lateral position of the tape 108 relative to the head 114 is determined from information of the second servo channel within determination unit 10.

In a second step 202, a lateral position difference (Δy) between the first lateral position and the second lateral position is determined. In a third step 203, a number of unsupported wraps (n_eff) of the tape 108 is computed as a function of the lateral position difference (Δy), wherein the number of unsupported wraps (n_eff) depends on Δy, velocity of the tape 108, tension of the tape 108 and tape medium.

The third step 203 may comprise determination of tape parameters a, b. The number of unsupported wraps (n_eff) may be calculated as a function of the difference of the lateral position (Δy) by computing the number of unsupported wraps (n_eff) as a function of tape parameters a, b which depend on the tape medium, the velocity of the tape 108 and tension of the tape 108.

These parameters may be determined in several sub-steps. In a first sub-step 203a, a waveform with predefined spectral characteristic is applied to at least one control current at least two known tape longitudinal positions.

In a second sub-step 203b, a resonance frequency (RF) of the tape path is determined. Subsequently in a third sub-step 203c, the spring constant (SP) is estimated at the known tape longitudinal positions.

In a fourth sub-step 203d, the tape parameters (TP) are determined from the at least two measured tape spring constant values.

In a fourth step 204, a spring constant ($K_T$) of the tape 108 is determined as a function of the number of unsupported wraps (n_eff), the radius (r) of the take-up reel 112 and the nominal tape path length (L0). At least one unit 13, 14, 15 of the tape transport system 100 can be calibrated in a fifth step 205 dependent on the spring constant ($K_T$).

The above described method and also the control device 1 can be implemented using computerized devices which can be suitably designed for implementing embodiments of the present invention as described herein. In that respect, it can be appreciated that the methods described herein are largely non-interactive and automated. In exemplary embodiments, the method described herein can be implemented either in an interactive, partly-interactive or non-interactive system. The method described herein can be implemented in software (e.g., firmware), hardware, or a combination thereof. In exemplary embodiments, the methods described herein are implemented in software, as an executable program, the latter executed by suitable digital processing devices. In further exemplary embodiments, at least one step or all steps of above method of FIG. 11 or the control device 1, e.g., of FIG. 1, may be implemented in software, as an executable program, the latter executed by suitable digital processing devices. More generally, embodiments of the present invention can be implemented, wherein general-purpose digital computers, such as personal computers, workstations, etc., are used.

Figure 12:
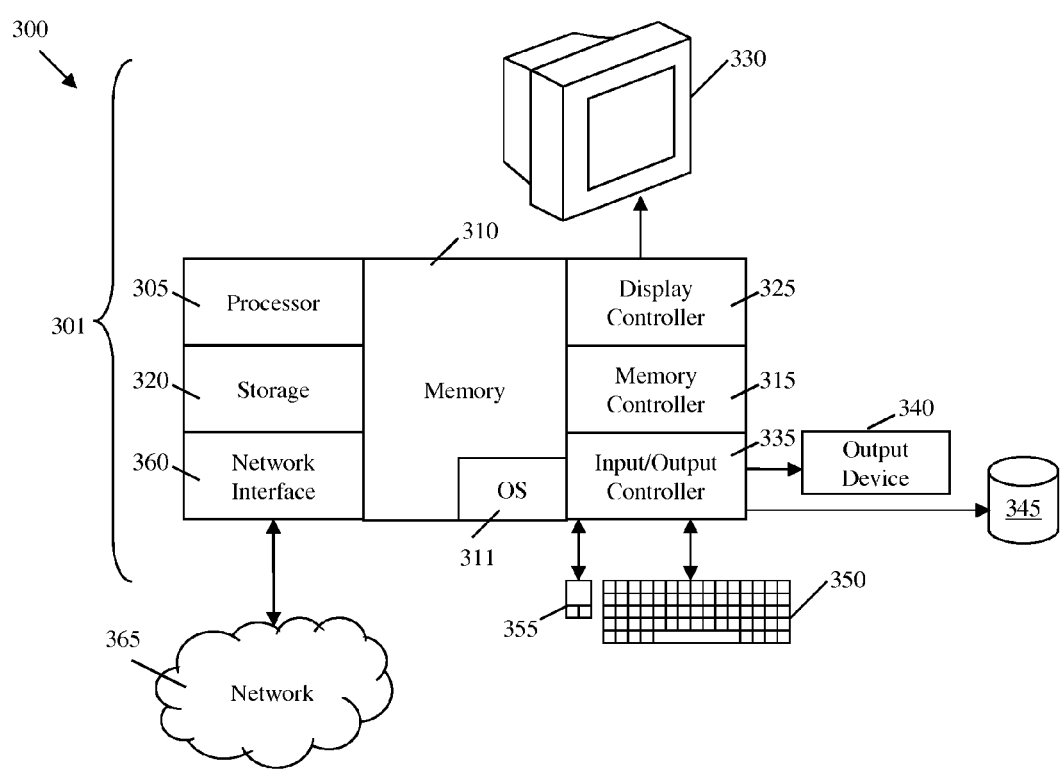
FIG. 12 shows a schematic diagram of an embodiment of a system adapted for controlling the transport of a tape.

For instance, the system 300 depicted in FIG. 12 schematically represents a computerized unit 301, e.g., a general-purpose computer. In exemplary embodiments, in terms of hardware architecture, as shown in FIG. 18, the unit 301 includes a processor 305, memory 310 coupled to a memory controller 315, and one or more input and/or output (I/O) devices 340, 345, 350, 355 (or peripherals) that are communicatively coupled via a local input/output controller 335. The input/output controller 335 can be, but is not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 305 is a hardware device for executing software, particularly that stored in memory 310. The processor 305 can be any custom made or commercially available processor, a central processing unit (CPU), an auxiliary processor among several processors associated with the computer 301, a semiconductor based microprocessor (in the form of a microchip or chip set), or generally any device for executing software instructions.

The memory 310 can include any one or combination of volatile memory elements (e.g., random access memory) and nonvolatile memory elements. Moreover, the memory 310 may incorporate electronic, magnetic, optical, and/or other types of storage media. Note that the memory 310 can have a distributed architecture, where various components are situated remote from one another, but can be accessed by the processor 305. For instance, configurations for the controllers 13 to 15 or information in view of the tape 108 or other data can be stored in the memory 310.

The software in memory 310 may include one or more separate programs, each of which comprises an ordered listing of executable instructions for implementing logical functions. In the example of FIG. 12, the software in the memory 310 includes methods described herein in accordance with exemplary embodiments and a suitable operating system (OS) 311. The OS 311 essentially controls the execution of other computer programs, such as the method as described herein (e.g., FIG. 11) or the control device 1 as described herein (e.g., FIG. 1), and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 310, so as to operate properly in connection with the OS 311. Furthermore, the methods can be written as an object oriented programming language, which has classes of data and methods, or a procedure programming language, which has routines, subroutines, and/or functions.

Possibly, a conventional keyboard 350 and mouse 355 can be coupled to the input/output controller 335. Other I/O devices 340-355 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 335 for further processing. Sensor nodes are ideally small, consume low energy, are autonomous and operate unattended.

In addition, the I/O devices 340-355 may further include devices that communicate both inputs and outputs. The system 300 can further include a display controller 325 coupled to a display 330. In exemplary embodiments, the system 300 can further include a network interface or transceiver 360 for coupling to a network 365. For instance, the tape transport system 100 of FIG. 1 may be controlled via a network 365 when used in a tape library.

The network 365 transmits and receives data between the unit 301 and external systems. The network 365 is possibly implemented in a wireless fashion, e.g., using wireless protocols and technologies, such as WiFi, WiMax, etc. The network 365 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 365 can also be an IP-based network for communication between the unit 301 and any external server, client and the like via a broadband connection. In exemplary embodiments, network 365 can be a managed IP network administered by a service provider. Besides, the network 365 can be a packet-switched network such as a LAN, WAN, Internet network, etc.

If the unit 301 is a PC, workstation, intelligent device or the like, the software in the memory 310 may further include a basic input output system (BIOS). The BIOS is stored in ROM so that the BIOS can be executed when the computer 301 is activated. The track-follow control system 10 may be part of the unit 301.

When the unit 301 is in operation, the processor 305 is configured to execute software stored within the memory 310, to communicate data to and from the memory 310, and to generally control operations of the computer 301 pursuant to the software. The methods described herein and the OS 311, in whole or in part are read by the processor 305, typically buffered within the processor 305, and then executed. When the method described herein (e.g., with reference to FIG. 11) is implemented in software, the method can be stored on any computer readable medium, such as storage 320, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 301, partly thereon, partly on a unit 301 and another unit 301, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

USED REFERENCE SIGNS 1 control device
10 determination unit
11 computing unit
12 calibration unit
13 supply reel controller
14 take-up reel controller
15 actuator controller
18 actuator input signal
21-25 servo bands
31-34 data bands
41 tape motion
42 servo band pitch
43 servo band width
51 Coulomb friction
52 tape velocity
53 damper coefficient ($D_T$)
54 spring constant ($K_T$)
100 tape transport system
101 servo channel information
102 secondary velocity
103 secondary velocity
104 inboard reel control signal
105 outboard reel control signal
108 tape
110 sensor
111 sensor
112 take-up reel
113 supply reel
114 head
115 actuator
201-205 method steps
300 system
301 computerized unit
305 processor
310 memory
311 operating system (OS)
315 memory controller
320 storage
325 display controller
340 display
345, 350, 355 input and/or output (I/O) devices
335 local input/output controller
350 keyboard
355 mouse
360 network interface or transceiver
365 network
C1-C16 curves
P1, P2 regions or points on the curves
FW forward direction
BW reverse direction
R1-R4 roller
SI servo information

The invention claimed is:

1. A control device for controlling the transport of a tape within a tape transport system, the tape transport system having a head operable to read data from and/or write data to the tape, a supply reel and a take-up reel, wherein the tape is moveable from the supply reel to the take-up reel, the control device comprising:
   a determination unit having at least a first servo channel and a second servo channel to determine a first lateral position of the tape relative to the head from information of the first servo channel and a second lateral position of the tape relative to the head from information of the second servo channel, and to determine a lateral position difference between the first lateral position and the second lateral position;

a computing unit configured to compute a number of unsupported wraps of the tape as a function of the lateral position difference, wherein the number of unsupported wraps corresponds to the number of layers of the tape around the take-up reel having air layers in-between, and to compute a spring constant of the tape as a function of the number of unsupported wraps, a radius of the take-up reel and a nominal tape path length; and a calibration unit configured to calibrate at least one unit of the tape transport system dependent on the spring constant.

2. The control device of claim 1, wherein the at least one unit is one of the group of: a take-up reel controller, a supply reel controller, a skew controller, and an actuator controller.

3. The control device of claim 1, wherein the determination unit is adapted to determine the tape dimensional stability of the tape as a function of the lateral position difference.

4. The control device of claim 3, wherein the computing unit is adapted to compute the number of unsupported wraps of the tape dependent on a velocity of the tape at the head and a tension of the tape.

5. The control device of claim 1, wherein the nominal tape path length is the tape path length between the take-up reel and the supply reel at zero velocity.

6. The control device of claim 1, wherein the computing unit is adapted to compute the spring constant of the tape dependent on the area of the cross section of the tape.

7. The control device of claim 1, wherein the computing unit is adapted to compute the spring constant of the tape dependent on mechanical characteristics of the tape, in particular the elastic modulus of the tape.

8. The control device of claim 1, wherein the calibration unit is adapted to calibrate reel controllers of the take-up reel and the supply reel and/or an actuator controller.

9. The control device of claim 1, wherein the control device is adapted to control the units of the tape transport system dependent on the calibration.

10. A tape transport system, comprising:
a head operable to read data from and/or write data to a tape;
a supply reel and a take-up reel, wherein the tape is moveable from the supply reel to the take-up reel; and
a control device configured to control transport of the tape, the control device further comprising:
a determination unit having at least a first servo channel and a second servo channel to determine a first lateral position of the tape relative to the head from information of the first servo channel and a second lateral position of the tape relative to the head from information of the second servo channel, and to determine a lateral position difference between the first lateral position and the second lateral position;
a computing unit configured to compute a number of unsupported wraps of the tape as a function of the lateral position difference, wherein the number of unsupported wraps corresponds to the number of layers of the tape around the take-up reel having air layers in-between, and to compute a spring constant of the tape as a function of the number of unsupported wraps, a radius of the take-up reel and a nominal tape path length; and
a calibration unit configured to calibrate at least one unit of the tape transport system dependent on the spring constant.

11. The tape transport system of claim 10, wherein the at least one unit is one of the groups of: a take-up reel controller, a supply reel controller, a skew controller, and an actuator controller.

12. A method for controlling the transport of a tape within a tape transport system, the tape transport system having a head operable to read data from and/or write data to the tape, a supply reel and a take-up reel, wherein the tape is moveable from the supply reel to the take-up reel, wherein the tape system comprises a control device comprising a determination unit having at least a first servo channel and a second servo channel, the method comprising:
determining a first lateral position of the tape relative to the head from information of the first servo channel and a second lateral position of the tape relative to the head from information of the second servo channel;
determining a lateral position difference between the first lateral position and the second lateral position;
estimating a number of unsupported wraps of the tape as a function of the lateral position difference, wherein the number of unsupported wraps corresponds to the number of layers of the tape around the take-up reel having air layers in-between;
computing a spring constant of the tape as a function of the number of unsupported wraps, a radius of the take-up reel and a nominal tape path length; and
calibrating at least one unit of the tape transport system dependent on the spring constant.

13. The method of claim 12, wherein computing the number of unsupported wraps as a function of the difference of the lateral position comprises computing the number of unsupported wraps as a function of tape parameters which depend on the tape medium, the velocity of the tape and tension of the tape.

14. The method of claim 13, further comprising determining the tape parameters by:
modulating at least one control current at least two tape longitudinal positions by applying a signal having a waveform with predefined spectral characteristic;
determining a resonance frequency of a tape path;
estimating the spring constant at the tape longitudinal positions; and
determining the tape parameters from the at least two measured tape spring constant values.

15. The method of claim 14, wherein determining a resonance frequency of the tape path comprises monitoring the tape tension response during the application of the waveform.

16. The method of claim 14, wherein estimating the spring constant at the known tape longitudinal positions comprises mapping the resonance frequency to the reel radius of the take-up reel.

17. The method of claim 12 for controlling the transport of a tape within a tape transport system being executed by a computer program comprising a program code when run on at least one computer.

* * * * *